US010526184B2

(12) United States Patent
Böhm et al.

(10) Patent No.: US 10,526,184 B2
(45) Date of Patent: Jan. 7, 2020

(54) EXHAUST VALVE ASSEMBLY FOR A BOTTLE ATTACHMENT APPARATUS

(71) Applicant: BRAND GMBH + CO KG, Wertheim (DE)

(72) Inventors: Dieter Böhm, Wertheim (DE); Michael Ertl, Marktheidenfeld (DE); Günter Hochholzer, Werbach (DE); Bernhard Kämmerer, Wertheim (DE); Ottmar Kneucker, Helmstadt (DE); Markus Kurz, Wertheim (DE)

(73) Assignee: BRAND GMBH + CO KG, Wertheim (DE)

(*) Notice: Subject to any disclaimer, the term of this patent is extended or adjusted under 35 U.S.C. 154(b) by 0 days.

(21) Appl. No.: 16/051,855

(22) Filed: Aug. 1, 2018

(65) Prior Publication Data
US 2018/0339893 A1 Nov. 29, 2018

Related U.S. Application Data

(62) Division of application No. 15/002,810, filed on Jan. 21, 2016, now Pat. No. 10,071,896.

(30) Foreign Application Priority Data

Jan. 23, 2015 (DE) .................... 20 2015 000 521 U

(51) Int. Cl.
*B67C 3/28* (2006.01)
*B05B 15/30* (2018.01)
(Continued)

(52) U.S. Cl.
CPC .......... *B67C 3/284* (2013.01); *B05B 11/3004* (2013.01); *B05B 11/3015* (2013.01);
(Continued)

(58) Field of Classification Search
CPC ........... B67C 3/007; B67C 3/26; B67C 3/284; G01F 11/28; G01F 11/04; G01F 11/023;
(Continued)

(56) References Cited

U.S. PATENT DOCUMENTS

| 3,494,987 A | 2/1970 | Ioka et al. |
| 3,729,022 A | 4/1973 | Roach |

(Continued)

FOREIGN PATENT DOCUMENTS

| DE | 1 632 032 A1 | 8/1970 |
| DE | 26 33 723 A1 | 2/1977 |

(Continued)

OTHER PUBLICATIONS

Brand General Catalog 900 (Jun. 2013), pp. 334-341.

*Primary Examiner* — J C Jacyna
(74) *Attorney, Agent, or Firm* — David S. Safran; Roberts Mlotkowski Safran Cole & Calderon, P.C.

(57) ABSTRACT

An exhaust valve assembly for a bottle attachment apparatus for handling liquids has a valve housing which forms a valve chamber having an inlet and an outlet, an exhaust valve body disposed on the inlet in the valve chamber, and a safety valve body disposed on the outlet in the valve chamber. The exhaust valve body is biased toward an exhaust valve seat, counter to the flow direction of the liquid and the safety valve body is biased toward a safety valve seat in the flow direction of the liquid. The safety valve seat is integrally molded on the valve housing.

5 Claims, 7 Drawing Sheets

(51) Int. Cl.
*G01F 11/02* (2006.01)
*B05B 11/00* (2006.01)
*G01F 11/04* (2006.01)
*G01F 11/28* (2006.01)
*B67C 3/00* (2006.01)
*B67C 3/26* (2006.01)

(52) U.S. Cl.
CPC .......... *B05B 11/3018* (2013.01); *B05B 15/30* (2018.02); *B67C 3/007* (2013.01); *B67C 3/26* (2013.01); *G01F 11/028* (2013.01); *G01F 11/04* (2013.01); *G01F 11/28* (2013.01); *B05B 11/0054* (2013.01)

(58) Field of Classification Search
CPC ............... G01F 11/028; B05B 11/3001; B05B 11/3015; B05B 11/3018; B05B 11/3004; B05B 11/0054; B05B 15/005
See application file for complete search history.

(56) References Cited

U.S. PATENT DOCUMENTS

| | | |
|---|---|---|
| 3,940,027 A | 2/1976 | Marterer |
| 4,046,836 A | 9/1977 | Adelmann et al. |
| 4,074,831 A | 2/1978 | Roach |
| 4,273,257 A | 6/1981 | Smith et al. |
| 4,306,670 A | 12/1981 | Oshikubo |
| 4,429,904 A | 2/1984 | Reimert |
| 4,526,294 A | 7/1985 | Hirschmann et al. |
| 5,862,958 A | 1/1999 | Edwards et al. |
| 6,135,325 A | 10/2000 | Fessel et al. |
| 8,142,738 B2 | 3/2012 | Boehm et al. |
| 8,245,887 B2 | 8/2012 | Ohshima |
| 8,597,593 B2 | 12/2013 | Boehm et al. |
| 8,668,117 B2 | 3/2014 | Crossdale et al. |
| 8,973,847 B2 | 3/2015 | Iammatteo et al. |
| 9,352,949 B2 | 5/2016 | Rege et al. |
| 2009/0123226 A1 | 5/2009 | Viegener |
| 2009/0160133 A1 | 6/2009 | Williams et al. |
| 2010/0021349 A1 | 1/2010 | Boehm et al. |
| 2011/0127298 A1 | 6/2011 | Shah |
| 2013/0172477 A1 | 7/2013 | Hintzer et al. |
| 2015/0114997 A1* | 4/2015 | Uldry ...................... B05B 15/58 222/309 |
| 2016/0068380 A1 | 3/2016 | Rege et al. |
| 2016/0214127 A1 | 7/2016 | Böhm et al. |
| 2016/0214846 A1 | 7/2016 | Hochholzer et al. |
| 2016/0214847 A1 | 7/2016 | Böhm et al. |
| 2016/0214848 A1 | 7/2016 | Böhm et al. |
| 2016/0264391 A1 | 9/2016 | Hochholzer et al. |

FOREIGN PATENT DOCUMENTS

| | | |
|---|---|---|
| DE | 36 07 139 A1 | 9/1987 |
| DE | 198 00 709 A1 | 7/1999 |
| DE | 20 2009 012 054 U1 | 3/2011 |
| EP | 0 542 241 A2 | 5/1993 |
| EP | 1 236 976 A1 | 9/2002 |

\* cited by examiner

EXHAUST VALVE ASSEMBLY FOR A BOTTLE ATTACHMENT APPARATUS

CROSS REFERENCE TO RELATED APPLICATIONS

This application is a division of commonly owned, U.S. patent application Ser. No. 15/002,810, filed Jan. 21, 2016, which claims the benefit of priority to German Patent Application DE 20 2015 000 521.7 filed Jan. 23, 2015.

BACKGROUND OF THE INVENTION

Field of the Invention

The invention relates to an exhaust valve assembly for a bottle attachment apparatus for handling liquids, to an exhaust line assembly, to a valve block assembly, and to a bottle attachment apparatus for handling liquids.

Description of Related Art

In the case of bottle attachment apparatuses for handling liquids, the focus is on precisely measuring and conveying liquids from a storage bottle or another storage container, wherein precise measuring is performed when a partial volume of liquid is received from the storage bottle or similar into the apparatus and/or when a partial volume of liquid is externally dispensed from the apparatus into a container.

Bottle attachment apparatuses of the type being discussed are in particular bottle attachment dispensers and burettes. Bottle attachment apparatuses of this type are widely used in chemical, biological, and pharmaceutical laboratories and production facilities.

The term "liquid" in the present context preferably refers to liquids as are used in chemical, biological, and pharmaceutical laboratories and production facilities etc. These are preferably liquids having a relative viscosity of up to about 300 (viscosity relative to the viscosity of water, measured at normal conditions). In colloquial terms, the liquids are thus preferably those in the range of very low viscosity to slightly viscous.

In the case of bottle attachment apparatuses of the type being discussed, high requirements are set for volume accuracy of liquid intake and/or liquid dispensation, and for operator safety. The bottle attachment apparatuses are usually operated manually or are driven by an actuator.

A typical example of a bottle attachment apparatus in the form of a bottle top dispenser is known from European Patent Application EP 0 542 241 A2. The present invention proceeds from this prior art. For bottle attachment apparatus in the form of bottle top dispensers, reference is made to European Patent Application EP 0 542 241 A2, the entire content of which is hereby incorporated by reference.

In an exemplary manner, a bottle attachment apparatus in the form of a buret is known from European Patent Application EP 2 799 141 A2 and corresponding U.S. Pat. No. 8,142,738 B2. A bottle attachment apparatus in the form of burette has many construction details in common with a bottle attachment apparatus in the form of a bottle top dispenser. Also to this extent, reference is made to European Patent Application EP 2 799 141 A2 and corresponding U.S. Pat. No. 8,142,738 B2 the entire extent content of which is hereby incorporated by reference.

Here and hereunder, a bottle attachment apparatus is always described in the operating position thereof, that is to say in the position thereof when fastened to a storage bottle or similar, and when aligned in a substantially vertical manner. A valve block assembly for such a bottle attachment apparatus is also described in a corresponding manner, that is to say likewise in the operating position thereof, that is to say when installed in a bottle attachment apparatus in the operating position thereof.

A substantial component part of a bottle attachment apparatus of the type being discussed is the cylinder-and-piston assembly with the aid of which the liquid may be suctioned and exhausted again. The cylinder-and-piston assembly has a cylinder which defines a longitudinal direction, and a piston which is guided in a sealed manner in the cylinder so as to be longitudinally displaceable. The direction of movement of the piston in the operating position of the bottle attachment apparatus is oriented so as to be vertical, in the following thus defining the vertical direction.

In the event of an upward movement of the piston in the cylinder, the liquid is suctioned by forming negative pressure in the cylinder. In the event of a downward movement, the liquid in the cylinder is exhausted again from the cylinder. The flow of the liquid during suctioning, on the one hand, and during exhausting, on the other hand, is directed by valves of the valve block assembly. The cylinder-and-piston assembly is connected in a sealing manner to the valve block assembly and to the lines which are located therein. The valve block assembly as such in turn is attached onto the storage bottle or similar with the aid of a fastening assembly.

An intake valve which allows liquid to be suctioned from the storage bottle by means of an intake pipe is located in the valve block of the valve block assembly. The intake pipe, most often in the form of a plug-fitted tube, extends deeply downward into the storage bottle. An exhaust line extends away from the valve block in an approximately horizontal manner. An exhaust valve sits in the exhaust line or in the valve block, so as to be at the beginning of the exhaust line. In some instances, an additional switching valve by way of which a return flow line leading back into the storage bottle may be opened or closed sits so as to be upstream of the exhaust line.

At the opening from which the liquid exits, the exhaust line may have a closure.

Since the exhaust line protrudes from the valve block in an approximately horizontal manner and the previously discussed switching valve also often sits there, this is the side from where an operator works on the bottle attachment apparatus. This side may be referred to as the "front side" of the bottle attachment apparatus. The opposite side is the "rear side" of the bottle attachment apparatus. In the case of an electronic design embodiment of a bottle attachment apparatus, a display having corresponding operating elements is preferably located on the front side of the bottle attachment apparatus.

The fastening assembly for fastening the external housing and/or the valve block assembly of the bottle attachment apparatus onto a storage bottle or similar is often a thread assembly which is similar to a union nut, or is an internal thread which is incorporated into the valve block per se, for screwing onto the external thread on a bottleneck of the storage bottle (see the prior art mentioned at the outset). However, in principle other fastening assemblies, such as bayonet systems or short-stroke collets are likewise employable, as are systems of the type of a taper-ground joint, which are usual in laboratories.

The present focus is on the region of the exhaust valve in the context of an exhaust valve assembly for a bottle attachment apparatus of the type being discussed, but also the further region downstream of the exhaust valve, that is to say in the region of an exhaust line assembly including the exhaust line, up to the tip thereof.

In the prior art from which the present invention proceeds (German Patent Application DE 36 07 139 A1), a respective exhaust valve assembly comprises a valve housing which forms a valve chamber having an inlet and an outlet. An exhaust valve body, which together with an exhaust valve seat which is likewise disposed there collectively forms the exhaust valve, is disposed on the inlet in the valve chamber. An additional safety valve body, which together with a safety valve seat which is disposed on the outlet forms an additional safety valve, is located at the outlet of the valve chamber of the valve housing. The safety valve has the task of preventing liquid from inadvertently leaking when the connector end of the exhaust line is pulled away from the exhaust valve assembly.

The connector end of the exhaust line, counter to a spring force, lifts the safety valve body from the safety valve seat at the outlet of the valve housing of the exhaust valve assembly and opens the flow path into the exhaust line. The connector end at the end side is provided in an encircling manner with preferably a plurality of openings, such that the liquid which flows around the valve body of the safety valve which has been lifted from the valve seat may radially flow into the connector end. For details of this construction reference is made to German Patent Application DE 36 07 139 A1.

In the case of the known exhaust valve assembly, the safety valve seat for the safety valve body is disposed on a valve bushing which is inserted in a sealing manner at the outlet of the valve housing. Sealing between this valve bushing and the valve housing is at times an issue. Moreover, the entry point of the connector end of the exhaust line is a region which is problematic in terms of leakages. Here, bending momentums which contribute to the connector end occasionally being loosened in the outlet of the valve housing arise during handling.

Downstream of the exhaust valve, a bottle attachment apparatus of the type being discussed has an exhaust line assembly. The exhaust line assembly includes at least the exhaust line, preferably also a mount supporting the exhaust line, and moreover in the case of a bottle attachment apparatus having return dosing, the switching valve which has been discussed in detail at the outset. If a switching valve is present, the exhaust line is connected downstream to the switching valve, while a connector end which is plug-fittable into the outlet of the valve housing or is push-fittable onto said outlet, and a return flow connector which is plug-fittable into a return flow inlet of the valve block or is push-fittable onto said return flow inlet are disposed on the switching valve, so as to be upstream thereof. So in the prior art the exhaust line assembly of a bottle attachment apparatus having a switching valve looks different from the exhaust line assembly in the case of a bottle attachment apparatus without a switching valve.

SUMMARY OF THE INVENTION

According to the invention, there is provided an exhaust valve assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block and an exhaust valve assembly, and the valve block preferably has a valve receptacle which is assigned to the exhaust valve assembly, wherein the exhaust valve assembly has a valve housing which forms a valve chamber having an inlet and an outlet, and which preferably is insertable into the valve receptacle in a replaceable and sealing manner, an exhaust valve body which is disposed on the inlet in the valve chamber, and a safety valve body which is disposed on the outlet in the valve chamber, wherein the exhaust valve body is biased toward an exhaust valve seat, counter to the flow direction of the liquid from the inlet to the outlet, wherein the safety valve body is biased toward a safety valve seat, in the flow direction of the liquid from the inlet to the outlet, and wherein the safety valve body is capable of being lifted off the safety valve seat by plugging a connector end of a line to be connected into the outlet of the valve housing, and wherein the safety valve seat is integrally molded on the valve housing.

In a preferred embodiment, there is provided a double-sided action tension spring for both valve bodies.

In a preferred embodiment, the valve bodies are embodied as valve balls.

It is provided that the safety valve seat is integrally molded on the valve housing. On account thereof, a sealing point which during operation often appears to be problematic is systematically eliminated. In particular in the case of the disassembled connector end of the line to be connected, in particular in the case of the exhaust line, pressure peaks arise in the valve block and in the valve housing of the exhaust valve assembly during sudden piston movements, but in the present case only impact on the sealing point between the safety valve body and the safety valve seat. In this case, the safety valve body in the event of such pressure peaks is even more intensely pushed onto the safety valve seat, this being a self-reinforcing seal. On account of the construction according to the invention, an external seal between the valve bushing and the valve housing, which is present in the prior art, has been dispensed with.

The above-described teaching of the invention functions with a connector end of a line which is to be directly connected, in particular of the exhaust line, but likewise functions with a connector end of a short line which as such is part of a switching valve disposed downstream of the exhaust valve. The connector end of the line to be connected may in principle be of no particular design embodiment. However, the connector end may also be a specially tailored end of the line to be connected, provided for example with a specially designed connector bushing or similar. The same correspondingly applies to the line section and the connector end thereof, which is formed by the short line on the switching valve or similar.

On the inlet side of the valve housing, the valve housing could simply be open, and the exhaust valve seat could be located on the valve block of the valve block assembly. However, in order for the exhaust valve assembly as such to be designed in a manageable way, it is recommended that the exhaust valve seat is disposed on a valve bushing which is inserted in a sealing manner at the inlet of the valve housing.

In terms of construction, it is furthermore recommended that the outlet of the valve housing is configured as a rotation-symmetrical port, the safety valve seat being located at the inner end thereof. This rotation-symmetric port may interact with corresponding portions at the connector end of the line to be connected, so as to achieve improved sealing. This will be covered further below.

The exhaust valve assembly in the assembled state must be insertable in a well sealing manner in the valve receptacle on the valve block of the valve block assembly also on the inlet side of the valve housing. Here, the solutions which are favored in the state of the art may be chosen.

However, if the system is to be further improved and opening and closing of the safety valve by way of an exhaust valve assembly to be designed in a functionally more reliable manner, it is recommended that the valve housing has a stop portion, a fastening portion which is distinct therefrom, and a sealing portion which is distinct from both the former. This is particularly expedient when the valve housing and the exhaust line assembly are in each case disposed on or fastened to the valve block, respectively. In the prior art, the fastening portion on the valve housing in the case of a valve housing which is inserted by press-fitting is normally the cylindrical sleeve face, or an external thread disposed on the cylinder sleeve, which engages with an internal thread on an internal wall of the valve receptacle, respectively. According to the invention, however, the stop portion and the fastening portion are supplemented on the valve housing by a sealing portion which is distinct from both the former. As opposed to the prior art in which the end stop portion achieves the sealing effect of the valve housing in the valve receptacle, the sealing effect in the case of the exhaust valve assembly according to the invention is substantially achieved by means of the distinct sealing portion.

In the case of an exhaust valve assembly which is installed in a functionally correct manner, the fastening portions of the valve housing and of the valve receptacle are in force-transmitting mutual engagement in such a manner that both the stop portions as well as the sealing portions thereof bear on one another in a planar manner.

The above-discussed construction utilizes minimal static redundant dimensioning on account of the stop portions in conjunction with the sealing portions. The sealing portions, when bearing on one another, are deformed for so long and thus in only a minimal manner, until the stop portions also bear on one another.

The stop portion on the valve housing of the exhaust valve assembly (like the corresponding stop portion on the valve receptacle in the valve block of the valve block assembly), typically runs so as to be substantially perpendicular to the longitudinal axis defined by the valve housing. The stop portion may also run so as to slightly deviate from the perpendicular angle in relation to the longitudinal axis. To this extent, a deviation of 10° in relation to the perpendicular angle should preferably not be exceeded.

According to the invention, there is preferably no additional sealing element on the stop portion. If the valve housing is inserted into the valve receptacle, the mutually assigned stop portions bear on one another in a planar manner. The mutual mating of the stop portions predefines the fixed point for insertion. The dimensions of the valve housing of the exhaust valve assembly, on the one hand, and of the valve receptacle, on the other hand, are set such that in this state the sealing portions also bear on one another in a planar manner. On account thereof, a large sealing face in the direction of the longitudinal axis results.

The particularities of the sealing of valve inserts in valve receptacles on a valve block assembly for a bottle attachment apparatus of the type being discussed are the subject matter of a simultaneously filed application by the applicant.

Presently, a few interesting aspects of the assembly for an exhaust valve assembly according to the present invention are to be discussed in conjunction with a valve receptacle on the valve block of the valve block assembly. This is not to be understood as limiting. This discussion only serves to improve understanding. The subject matter of the claims here, however, is primarily the exhaust valve assembly as such, having the features which are relevant to this exhaust valve assembly.

The exhaust valve assembly according to the invention guarantees a reliable sealing function at a low compression force which is to be applied by the fastening portions, wherein additional sealing may be dispensed with. In particular, in the case of the construction according to the invention it is not required that the valve housing is removed or released prior to autoclaving. Distributing the functions across distinct portions leads to the degrees of freedom required for being able to consider deformation of the plastics during autoclaving.

The preferred construction in the case of the exhaust valve assembly according to the invention is such that the stop portion on the valve housing is disposed on the front end of the valve housing that is located in the valve receptacle, that the sealing portion is disposed in the direction of the opposite, rear end of the valve housing and adjoining the stop portion, and the fastening portion is disposed in the direction of the rear end of the valve housing, so as to adjoin the sealing portion.

As an alternative, the stop portion on the valve housing may also be moved so as to be between the sealing portion and the fastening portion, or even so as to be entirely up front, even ahead of the fastening portion. However, the previously mentioned variant has the advantage that the stop portions which bear on one another in a planar manner already fulfill a sealing function.

The indication of a portion being disposed so as to "adjoin" another portion may preferably mean that they are directly adjoining. However, this indication is not limited to this understanding. In principle it is also possible for certain spacings to be present between the portions, in a certain sense thus "intermediate portions", which are irrelevant in the context of the invention.

If the system is to be improved in an alternative manner or by a preferred arrangement of the sealing portions, it is recommended that the sealing portions in relation to the longitudinal axis are aligned at an acute angle, preferably at an angle between 1° and 20°, particularly preferably at an angle between 2° and 10°. The sealing portions thus do not run parallel with the longitudinal axis, so that the compression force which is relevant to the sealing effect may be only radially aligned, but the former run so as to be slightly inclined in relation to the longitudinal axis. On account thereof, an adequate radial effect of force on the sealing portions may be implemented by a force component which acts in the direction of the longitudinal axis. In this way, the sealing portions acquire their optimum sealing effect, while radial compression of the plastics material in the sealing portions, on account of the stop effect thereof, positions the valve housing in the valve block.

Proceeding from one preferred variant having a valve housing which in relation to the longitudinal axis is rotation-symmetrical, the sealing portions in the above-discussed concept are configured in a truncated-cone shape.

However, in principle the valve housing and the associated valve receptacle may also be embodied so as not to be rotation-symmetrical; this would lead to a prismatic design of the sealing portions.

According to a further preferred constructional variant, it may be provided that the angle of the sealing portion on the valve receptacle in relation to the longitudinal axis is up to 2.5° larger than the angle of the sealing portion on the valve housing. In this way, the sealing portion on the valve housing initially impacts the sealing portion on the valve receptacle only by way of linear contact. If force is exerted by the fastening portions in the direction of the longitudinal axis, the linear contact by way of deformation of the sealing portions is transformed into a planar contact. In the course of time, accelerated in particular by high temperatures as in autoclaving, successive completion of the planar contact and thus reliable sealing across the sealing portions is performed.

The term "bearing on one another in a planar manner" thus does not mean that the sealing portions bear on one another across the full area from the outset. Rather, the extent of the faces of the sealing portions which bear on one another may be enlarged under the influence of pressure and temperature, until bearing of the sealing portions on one another across the entire area is achieved.

Insofar as manufacturing of the exhaust valve assembly is concerned, in any case manufacturing by the plastics injection molding method is predominantly recommended, specifically and expediently using fluoropolymers. At least one component which is composed of another material, potentially of a metallic material which is suitable or suitably finished for the liquids to be handled, is located in the exhaust valve assembly by way of the spring element which is most often present.

The construction of the valve block assembly according to the invention is of particular interest if the plastics of the mutually interacting components are selected and mutually adapted so as to guarantee targeted deformation of the mutually interacting components on the faces which come to bear on one another. To this extent, it has proven expedient for both the plastics of the valve block as well as the plastics of the exhaust valve assembly to have a tensile strength in excess of 12 MPa at 120° C. (EN ISO 12086). It is particularly preferable here for the plastics of the valve block to have a tensile strength (EN ISO 12086, measured at 23° C.) which is higher by 40% to 100% than the plastics of the exhaust valve assembly (see also the general catalog of the applicant BRAND ("Gesamtkatalog 900" [General catalog 900], June 2013, pp. 334-341).

Up to this point, with reference to the teaching of the invention, no further discussion pertaining to the design of the fastening portions has taken place. It is recommended that the fastening portions are designed such that a defined effect of force may be achieved. Here, the design embodiment of the fastening portions as mutually engaging screw thread portions is particularly preferable. A bayonet connection, a short-stroke clamping connection, or a stopper-type connection are also conceivable. However, the design embodiment of the fastening portions as a screw connection allows the exhaust valve assembly to be inserted into the valve receptacle in a particularly sensitive manner, up to the stop of the stop portions which is clearly perceivable during screwing-in.

In order for fastening portions which are embodied as mutually engaging screw thread portions to be actuated, it is recommended according to one further preferred teaching of the invention that an actuation portion having force-engaging elements for actuating this fastening portion is disposed on the valve housing, so as to adjoin the fastening portion. By way of these force-engaging elements which are suitable for a hand tool, a torque may be transmitted to the mutually engaging fastening portions.

Preferably, a stop for the connector end of the line to be connected may also be provided so as to adjoin the fastening portion on the valve housing, such that the connector end in the direction of the longitudinal axis cannot be plugged to any arbitrary extent into the outlet of the valve housing. This, too, will be discussed further hereunder.

According to an independent teaching of the invention, the previously demonstrated issue pertaining to optimization is also solved by an exhaust line assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block and an exhaust valve assembly, and the valve block preferably has a valve receptacle which is assigned to the exhaust valve assembly, and wherein a return flow duct which terminates in a return flow inlet is provided in the valve block; wherein the exhaust valve assembly has a valve housing which forms a valve chamber having an inlet and an outlet, and which preferably is insertable into the valve receptacle of the valve block in a replaceable and sealing manner, wherein the exhaust line assembly has an exhaust line, wherein the exhaust line assembly has a switching valve which in the flow direction of the liquid is disposed upstream of the exhaust line and to which the exhaust line is connected downstream, and in which a connector end which is plug-fittable into the outlet of the valve housing or is push-fittable onto said outlet, and a return flow connector which is plug-fittable into the return flow inlet of the valve block or is push-fittable onto said return flow inlet are disposed on the switching valve, so as to be upstream thereof, or wherein the exhaust line assembly has a line adaptor which in the flow direction of the liquid is disposed upstream of the exhaust line and to which the exhaust line is connected downstream, and in which a connector end which is plug-fittable into the outlet of the valve housing or is push-fittable onto said outlet, and a return flow connector which is plug-fittable into the return flow inlet of the valve block or is push-fittable onto said return flow inlet are disposed on the line adaptor, so as to be upstream thereof, wherein the connector end in the line adaptor is connected to the exhaust line which is connected downstream, and wherein the return flow connector is embodied as a closed blind connector by way of which the return flow inlet of the valve block is closeable.

This exhaust line assembly may particularly preferably be employed in conjunction with an exhaust valve assembly according to the invention of the above-described construction, but need not be used in conjunction therewith.

The exhaust line assembly according to the invention is the function group of a bottle attachment apparatus of the type being discussed, which is located so as to be downstream of the exhaust valve or of the exhaust valve assembly, respectively. In any case, an exhaust line must be assigned to the exhaust line assembly.

Preferably, a cantilever-type mount which is attachable to the external housing and/or the valve block assembly and is preferably designed so as to be angular, in which the exhaust line for the liquid is disposed and guided, is also assigned thereto. Such a mount is often also referred to as a cannula mount.

The switching valve which has already been discussed above is then located in an exhaust line assembly of the above-described construction, when the latter is a bottle attachment apparatus having return dosing. Said switching valve in the flow direction of the liquid lies ahead of the exhaust line, and the exhaust line is connected to this switching valve so as to be downstream thereof. The exhaust line may be opened or closed by means of the switching valve. The connector end of the line to be connected, which here is only the line piece up to the switching valve, and which connector piece has already been repeatedly discussed, is located upstream on the switching valve. Moreover, a return flow connector which is plug-fittable into a return flow inlet of the valve block, or is push-fittable thereon, is located upstream on the switching valve. Said return flow connector communicates with a return flow duct in the valve block and with a return flow line which leads into the storage bottle.

According to the invention it is furthermore provided that, in the case of there being no switching valve located in the exhaust line assembly, there is nevertheless a component inserted, which in terms of the various connections performs in the same manner as the switching valve. According to the invention, there is a line adaptor which is disposed ahead of the exhaust line in the flow direction of the liquid, and to which the exhaust line is connected downstream. Like the switching valve, the line adaptor has a connector end upstream which is plug-fittable into the outlet of the valve housing or is push-fittable thereon, and a return flow connector which is plug-fittable into the return flow inlet of the valve block or is push-fittable thereon. However, as opposed to the switching valve, the connector end in the line adaptor is connected to the exhaust line which is connected downstream and is thus not switchable, and the return flow connector is embodied so as to be closed off such that said return flow connector closes off the return flow inlet of the valve block when the exhaust line assembly is attached to the valve block assembly.

According to the invention the above-discussed construction has the advantage that the valve block assembly may be used independently of a switching valve being employed or not. Insofar as the connectors are concerned, the line adaptor substitutes for the switching valve; like the switching valve, said line adaptor is a single component which collectively forms the counterpart for both connectors on the valve block, that is to say the outlet and the return flow inlet.

It applies to all embodiments according to the invention that the connector end is plug-fittable in a sealing manner into the outlet of the valve housing, and when plug-fitted extends up to the safety valve seat in such a manner that the valve body is lifted from the safety valve seat.

It also applies to the further embodiments hereunder of an exhaust line assembly according to the invention in preferred design embodiments that the connector end mentioned here may both be located directly on an exhaust line as well as on a line piece on the respective side of a switching valve or of a line adaptor of the type discussed earlier.

Operator friendliness, in particular in the context of durable sealing, may also be optimized at that end of the valve housing which is assigned to the outlet. To this end, the outlet of the valve housing there may be embodied as a rotation-symmetrical port. The safety valve seat is located at the inner end of the port.

According to a further and independent teaching of the invention, in the case of a matching exhaust line assembly the connector end of the line to be connected (optionally also in the form of a line piece which is disposed on the switching valve or on the line adaptor) is designed in a particular manner.

In so far as an exhaust line assembly for a bottle attachment apparatus for handling liquids is provided, the bottle attachment apparatus has a cylinder-and-piston assembly for suctioning and exhausting liquid, a valve block assembly, optionally an external housing receiving the external and/or the valve block assembly, and a fastening assembly for fastening the external housing and/or the valve block assembly on a storage bottle or the like, wherein the valve block assembly has a valve block and an exhaust valve assembly, and the valve block has a valve receptacle which is assigned to the exhaust valve assembly, wherein the exhaust valve assembly has a valve housing which forms a valve chamber having an inlet and an outlet, and which preferably is insertable in the valve receptacle of the valve block in an replaceable and sealing manner, wherein the exhaust line assembly has an exhaust line, wherein the exhaust line assembly furthermore has a connector end of a line to be connected, which is plug-fittable in a sealing manner into the outlet of the valve housing of the exhaust valve assembly or is push-fittable onto said outlet, wherein the connector end is provided with a support collar which surrounds this connector end and which surrounds the connector end, preferably in a concentric manner, and wherein, in the case of an assembled exhaust line assembly, a port which is formed by the outlet of the valve housing is located between the connector end and the support collar surrounding the latter.

On account of the support collar, joining the connector end into the outlet becomes more reliable. Moreover, the external contour of the connector end, which is provided as a sealing face, is protected against damage by the surrounding support collar. To this end, the support collar at the end side and so as to be oriented upstream preferably protrudes beyond the connector end. This is of particular advantage since end-side openings on the connector end under certain circumstances cause the end thereof to become relatively unstable. The support collar is thus tried and tested protection for the sensitive connector end of the line to be connected.

In the case of an assembled exhaust line assembly, a port which is formed by the outlet of the valve housing is located between the connector end and the support collar surrounding the latter. This is a stable and expedient assembly by way of which sealing between the connector end and the port is also improved.

In order to further improve sealing, it may be provided that radially encircling sealing beads are molded externally on the connector end.

The support collar may be utilized for further functions. For example, the support collar, preferably on a grading, may have a longitudinal stop which interacts with the stop on the valve housing, which has been mentioned further above, so as to delimit the insertion path of the connector end in relation to the valve housing.

Overall, it may be recommended that the support collar is longer than the connector end as such. Said support collar in this way encloses the valve housing along a comparatively long stretch, and leads to optimal positioning of either the exhaust line as such or of the respective inlet port of the switching valve, in particular also while considering tilting and/or bending momentums which arise during operation.

The subject matter of the invention is also a valve block assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block and an exhaust valve assembly, and the valve block has a valve receptacle which is assigned to the exhaust valve assembly, wherein the exhaust valve assembly has a valve housing which forms a valve chamber having an inlet and an outlet, and which is insertable into the valve receptacle of the valve block in a replaceable and sealing manner, wherein the valve housing has a stop portion, a fastening portion which is distinct therefrom, and a sealing portion which is distinct from both the former, wherein the valve receptacle assigned to the exhaust valve assembly has stop portions, fastening portions, and sealing portions matching the stop portions, fastening portions, and sealing portions of the valve housing, and wherein the fastening portions are in force-transmitting mutual engagement in such a manner that both the stop portions as well as the sealing portions bear on one another in a planar manner.

In a preferred modification thereof the valve receptacle and the valve housing define a longitudinal axis, and the angle of the sealing portion on the valve receptacle in relation to the longitudinal axis is up to 2.5° larger than the angle of the sealing portion on the valve housing in relation to the longitudinal axis.

Further, there may be provided an improvement, wherein both the valve block and the exhaust valve assembly are at least largely composed of plastics suitable for treatment in an autoclave.

As to this valve block assembly, all the other features that are optional with relation to a valve block assembly, may be provided as well.

Finally, a bottle attachment apparatus for handling liquids as such is the subject matter of the invention as well.

In such a bottle attachment apparatus, an exhaust valve assembly according to the invention can be combined with an exhaust line assembly according to the invention and/or with a valve block assembly according to the invention.

This relates in particular to the mutual design and adaptation of the stop portions, fastening portions, and sealing portions. This has already been discussed in detail above, so that reference may be made to the explanations there.

In a particularly preferred embodiment of the invention, there is provided a bottle attachment apparatus for handling liquids, having a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block and an exhaust valve assembly, and the valve block has a valve receptacle which is assigned to the exhaust valve assembly, wherein the exhaust valve assembly has a valve housing which forms a valve chamber having an inlet and an outlet, and which is insertable into the valve receptacle in a replaceable and sealing manner, an exhaust valve body which is disposed on the inlet in the valve chamber, and a safety valve body which is disposed on the outlet in the valve chamber, the exhaust valve body is biased toward an exhaust valve seat, counter to the flow direction of the liquid from the inlet to the outlet, the safety valve body is biased toward a safety valve seat, in the flow direction of the liquid from the inlet to the outlet, and the safety valve body is capable of being lifted off the safety valve seat by plugging a connector end of a line to be connected into the outlet of the valve housing, and the safety valve seat is integrally molded on the valve housing, and/or wherein the exhaust valve assembly of the bottle attachment apparatus has a valve housing which forms a valve chamber having an inlet and an outlet, and which is insertable into the valve receptacle of the valve block in a replaceable and sealing manner, and there is provided an exhaust line assembly with an exhaust line, the exhaust line assembly has a switching valve which in the flow direction of the liquid is disposed upstream of the exhaust line and to which the exhaust line is connected downstream, and in which a connector end which is plug-fittable into the outlet of the valve housing or is push-fittable onto said outlet, and a return flow connector which is plug-fittable into the return flow inlet of the valve block or is push-fittable onto said return flow inlet are disposed on the switching valve, so as to be upstream thereof, or wherein the exhaust line assembly has a line adaptor which in the flow direction of the liquid is disposed upstream of the exhaust line and to which the exhaust line is connected downstream, and in which a connector end which is plug-fittable into the outlet of the valve housing or is push-fittable onto said outlet, and a return flow connector which is plug-fittable into the return flow inlet of the valve block or is push-fittable onto said return flow inlet are disposed on the line adaptor, so as to be upstream thereof, wherein the connector end in the line adaptor is connected to the exhaust line which is connected downstream, and wherein the return flow connector is embodied as a closed blind connector by way of which the return flow inlet of the valve block is closeable, and/or wherein the exhaust valve assembly has a valve housing which forms a valve chamber having an inlet and an outlet, and which is insertable into the valve receptacle of the valve block in a replaceable and sealing manner, wherein the valve housing has a stop portion, a fastening portion which is distinct therefrom, and a sealing portion which is distinct from both the former, the valve receptacle assigned to the exhaust valve assembly has stop portions, fastening portions, and sealing portions matching the stop portions, fastening portions, and sealing portions of the valve housing, and the fastening portions are in force-transmitting mutual engagement in such a manner that both the stop portions as well as the sealing portions bear on one another in a planar manner.

According to one further preferred teaching, the bottle attachment apparatus according to the invention may furthermore be designed in that the exhaust line assembly is attached to the valve block assembly and/or to the external housing in a replaceable manner and forwardly protrudes from the valve block assembly and/or from the external housing, that the exhaust line assembly has a cantilever-type mount and an exhaust line which is disposed and guided in the mount, and that the mount is releasably attached, preferably by means of a form-fitting connection, to the valve block assembly and/or to the external housing. On account of the mount being attached directly to the valve block assembly and/or to the external housing, in particular when this attaching is established by means of a form-fitting connection, the bending momentums which unavoidably arise during handling of the bottle attachment apparatus are kept away from the actual fluid connections.

If the bottle attachment apparatus is equipped with a switching valve, it is recommended that the mount is also connected to the switching valve, in particular in a form-fitting manner. The mount here forms the stays, such that respective fluid connections between the switching valve and valve block assembly may also be largely kept free of bending forces.

According to one preferred teaching, it furthermore applies to the exhaust line assembly according to the invention that the mount of the exhaust line assembly is connected to the switching valve or to the line adaptor in a form-fitting manner but also in a movable and preferably releasable manner, wherein the mount in relation to the switching valve or to the line adaptor is preferably attachable in two vertically dissimilar positions, namely in an upper position in which the mount is displaceable up to the external housing, and a lower position in which the mount is connected to the external housing so as to be form-fitting in the horizontal direction.

The switching valve which is a prerequisite in this case, or the line adaptor which instead of the former is present according to the invention, serves as a connection to the mount which to this extent consequently may also be embodied in an identical manner for exhaust line assemblies with or without a switching valve.

The invention will be explained in more detail in the following with reference to the accompanying drawings which merely illustrate preferred exemplary embodiments.

DETAILED DESCRIPTION OF THE INVENTION

Figure 1:
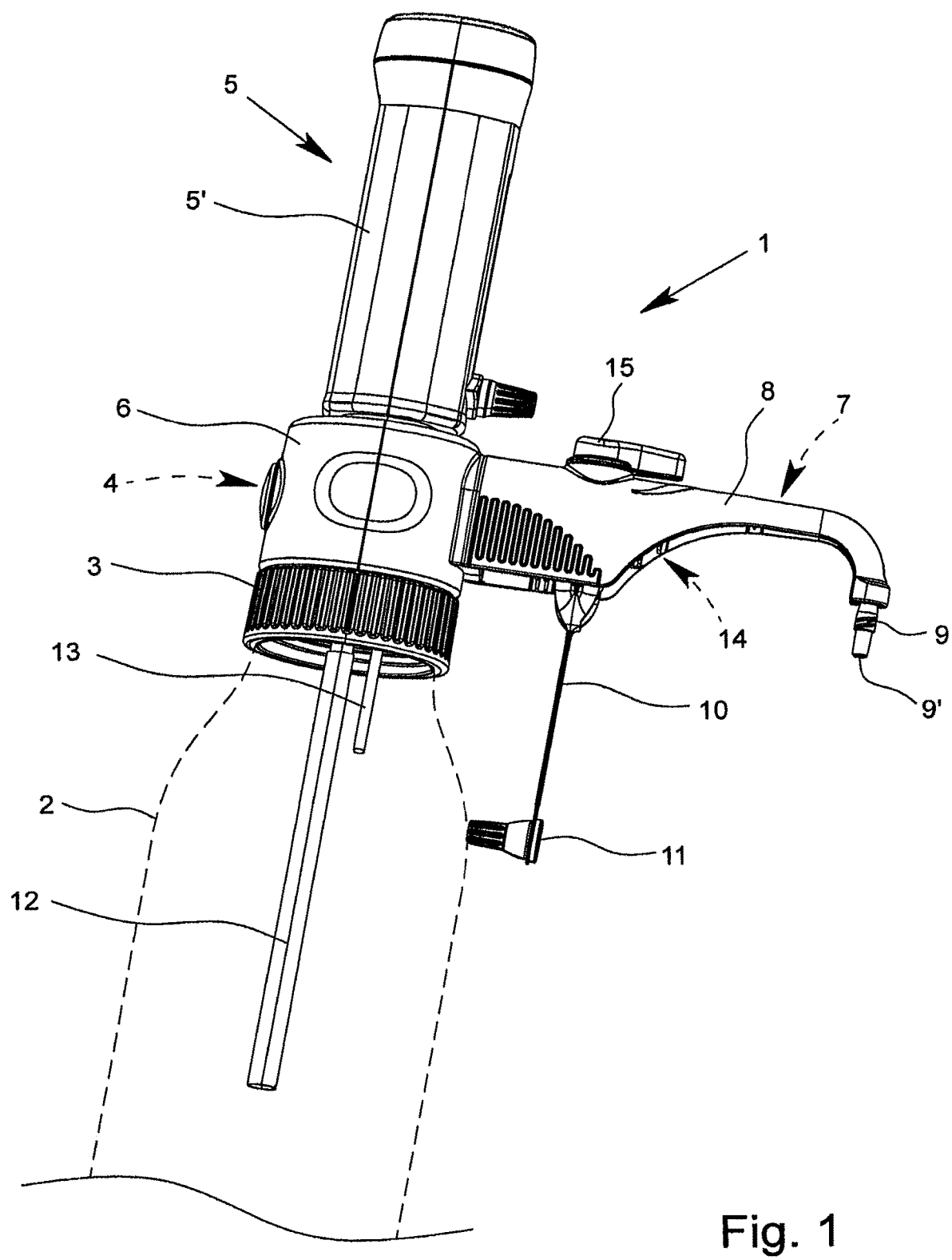
FIG. 1 shows a bottle attachment apparatus for handling liquids, in the form of a bottle attachment dispenser, in a perspective view.
Figure 2:
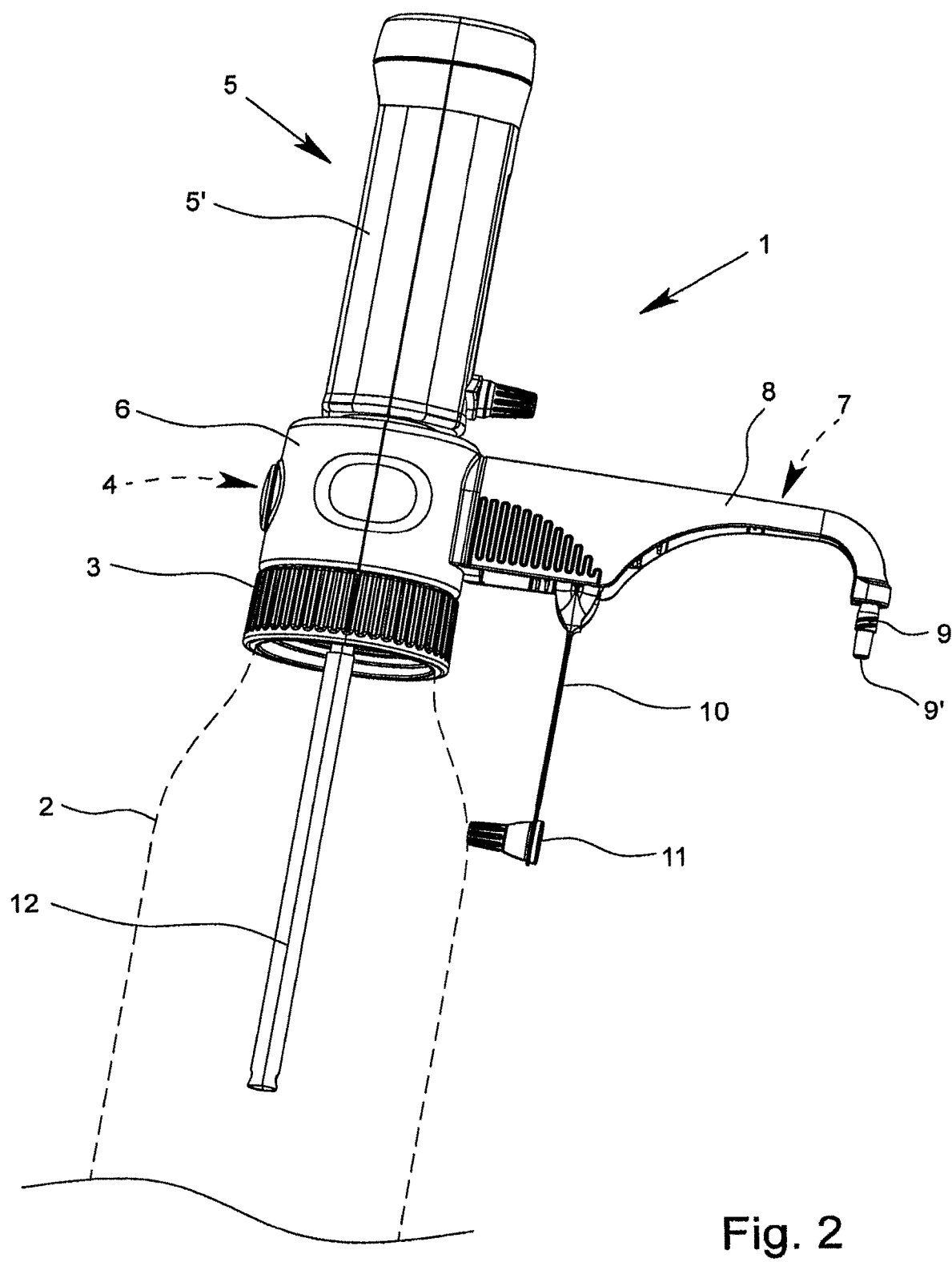
FIG. 2 shows a bottle attachment apparatus in a view corresponding to that of FIG. 1, but without a switching valve.

FIGS. 1 and 2 show preferred exemplary embodiments of a bottle attachment apparatus 1 according to the invention for handling liquids, herein in the form of a bottle top dispenser.

In general terms, in respect of bottle attachment apparatus for handling liquids, i.e., so-called "liquid handling" apparatuses, reference may be made to the general catalog of the applicant (BRAND general catalog 900 [June 2013]). Bottle attachment apparatus of the type being discussed are comprehensively explained therein in terms of construction and application. Moreover, in respect of bottle attachment apparatuses of the type being discussed, reference may also be made to the sources of the prior art, as stated at the outset.

The definitions pertaining to top and bottom, and to front and rear, which have been stated at the outset of the description, apply to the bottle attachment apparatus which is described here in the preferred exemplary embodiment. The bottle attachment apparatus 1 will always be discussed in the position which is illustrated in FIG. 1, so as to be on a storage bottle 2 as a preferred example of a storage container, even when said bottle attachment apparatus is not shown in this position in the individual illustrations.

During operation, the bottle attachment apparatus 1, which is illustrated in FIGS. 1 and 2, is attached to a storage bottle 2. More specifically, the bottle attachment apparatus 1 with the aid of a fastening assembly 3 is attached to the bottleneck of the storage bottle 2. If the bottleneck of the storage bottle 2 has an external thread, the fastening assembly 3 may be a type of annular cap having an internal thread, said annular cap being attached at the bottom of the bottle attachment apparatus 1. However, the fastening assembly 3 may also be configured in the form of a stopper-like plug assembly, or can assume other shapes. It is only essential that the bottle attachment apparatus 1 by means of the fastening assembly 3 may be securely fastened to the storage bottle 2 or to any other matching storage container.

The cylinder-and-piston assembly 5 of the bottle attachment apparatus 1 can in each case be seen at the top of FIGS. 1 and 2. The bottle attachment apparatus 1 presently has a cylinder-and-piston assembly 5 having an external cylinder housing 5' which encompasses the cylinder. A mechanical and adjustable stop for the length of the stroke is located on said cylinder housing 5'.

A valve block assembly 4 supports the cylinder-and-piston assembly 5, but the former as such according to the preferred teaching here is located in an external housing 6 of the bottle attachment apparatus 1, that is to say that said valve block assembly 4 is not directly identifiable in FIGS. 1 and 2. The fastening assembly 3 as such is located on the valve block assembly 4 or, as is the case here, on the external housing 6.

An exhaust line 7 forwardly protrudes from the external housing 6 of the bottle attachment apparatus 1, said exhaust line 7 in the illustrated exemplary embodiment being disposed and guided in a cantilever-type mount 8 which is of angular design. The exhaust line 7 terminates at a tip 9. A mounting lug 10 which holds a closure cap 11, by way of which the mouth opening 9' on the tip 9 may be closed off and protected against dripping liquid, is fastened to the mount 8.

An intake line 12 for liquid extends downward from the valve block assembly 4, which is hidden in the external housing 6, into the storage bottle 2. Besides the intake line 12, a return flow line 13 through which liquid may be directed back into the storage bottle 2 instead of through the exhaust line 7, if required, can be seen in FIG. 1.

A switching valve 14 which is suitable for returning the flow of liquid into the storage bottle 2 and which is actuatable by means of a toggle 15 on the upper side of the mount 8, here is located outside the valve block assembly 4 and outside the external housing 6, and in the preferred exemplary embodiment illustrated in FIG. 1, is located within the mount 8 for the exhaust line 7.

FIG. 2 shows a bottle attachment apparatus 1 in the form of a bottle top dispenser without a switching valve 14, that is to say without the "return dosing" function, which is explained in detail in the prior art (European Patent Application EP 0 542 241 A2). In this case, the return flow line 13 is normally missing.

Figure 3:
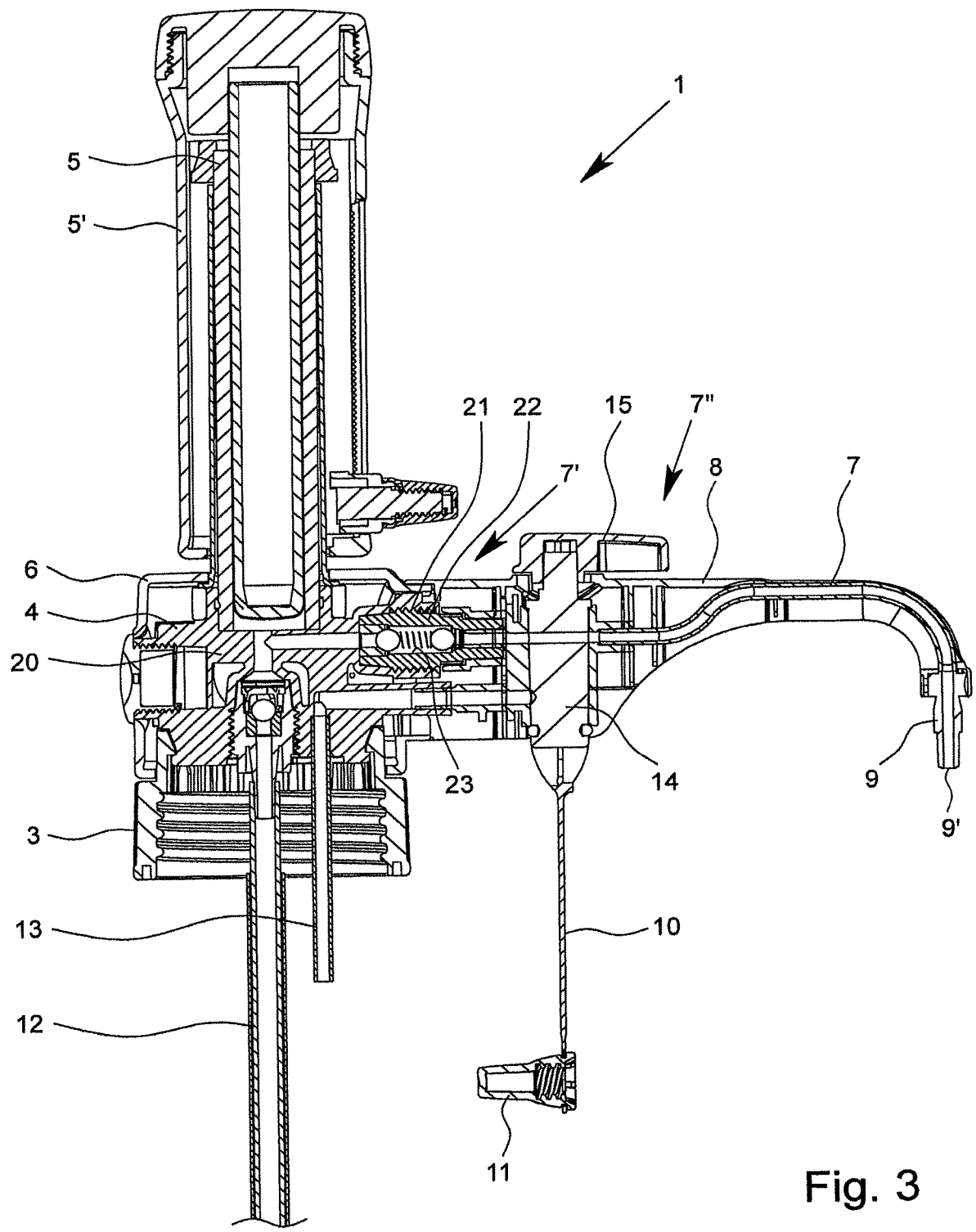
FIG. 3 shows the bottle attachment apparatus of FIG. 1 in a sectional view.

FIG. 3 shows the bottle attachment apparatus 1 of FIG. 1 in a sectional view. Here, the valve block assembly 4 in the external housing 6 is to be seen initially. The valve block assembly 4 is typically composed of plastics, in particular of plastics resistant to chemicals. The valve block assembly 4 has a multiplicity of ducts and installed elements, for which reference in detail may be made to the prior art which has been discussed at the outset.

The valve block assembly 4 presently shows a valve block 20 and, insofar as is relevant to the purpose of the present invention, an exhaust valve assembly 7' which in FIG. 3 is attached on the right of the valve block 20 of the valve block assembly 4. The valve block 20 has a valve receptacle 21 which is assigned to the exhaust valve assembly 7'.

It applies to the exhaust valve assembly 7' and to the other components of the bottle attachment apparatus 1 that they should at least largely be composed of plastics suitable for autoclaving. The same correspondingly applies to the valve block 20.

Here, the focus is initially on the design embodiment of the exhaust valve assembly 7'. The latter initially has a valve housing 22 which forms a valve chamber 23 having an inlet 24 and an outlet 25. This valve housing 22 is insertable in the valve receptacle 21 of the valve block 20 in a replaceable and sealing manner. In the exemplary embodiment illustrated in FIG. 3, the exhaust valve assembly 7' is installed in the bottle attachment apparatus 1, and the valve housing 22 is inserted in the valve receptacle 21.

Figure 4:
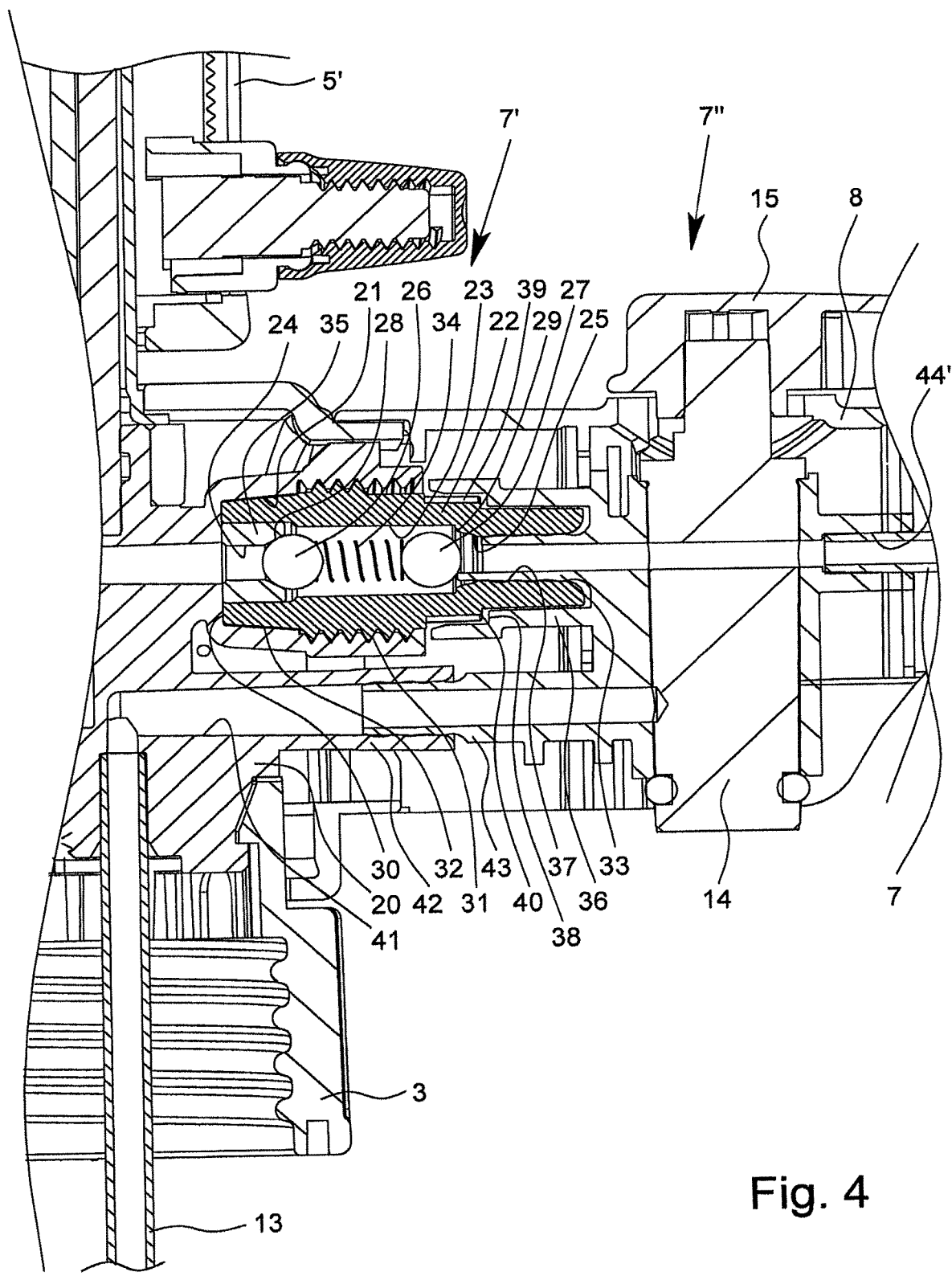
FIG. 4 shows the region of the exhaust valve assembly and of the mount of the bottle attachment apparatus of a preferred embodiment having a switching valve in a partial and enlarged view of FIG. 3.

FIG. 4 shows the region of interest of the bottle attachment apparatus 1 of FIG. 3, in an enlarged illustration.

It can be seen that an exhaust valve body 26 is disposed at the inlet 24 in the valve chamber 23 in the valve housing 22 of the exhaust valve assembly 7'. Accordingly, a safety valve body 27 is disposed at the outlet 25 in the valve chamber 23. In order for the exhaust valve body 26 to be reliably closed under normal circumstances, the exhaust valve body 26 is biased toward an exhaust valve seat 28, counter to the flow direction of liquid from the inlet 24 to the outlet 25. In a manner corresponding thereto, the safety valve body 27 is biased toward a safety valve seat 29, here however in the flow direction of the liquid from the inlet 24 to the outlet 25.

As can be derived from FIG. 4, the safety valve body 29 is capable of being lifted off the safety valve seat 29 by plugging a connector end 33 of a line which is connected here into the outlet 25 of the valve housing 22. The assembled construction is illustrated here; the safety valve body 27 in this case is thus lifted from the safety valve seat 29. At the same time, the connector end 33 which is plugged into the outlet 25 forms a sealing connection to the valve housing 22.

The exemplary embodiment having the switching valve 14, which is illustrated in FIG. 4, displays the connector end 33 on a line piece which forms the line to be connected and which protrudes from the switching valve 14 upstream thereof. As has been narrated in the general part of the description, the connector end 33 may however also be disposed directly on the exhaust line 7 or on another component, as will be discussed further below.

As is also provided in the prior art, the connector end 33 at the end side is provided in an encircling manner with preferably a plurality of openings, such that the liquid which can flow around the safety valve body 27 which has been lifted from the valve seat 29 may radially flow into the connector end 33. From there, in the construction which is illustrated in FIG. 4, the liquid flows further either through the switching valve 14 into the exhaust line 7 adjoining thereto or, diverted in the switching valve 14, back into the return flow line 13. Of course, it is in principle also possible for the switching valve 14 to assume a position completely blocking all liquid flow.

Biasing of the respective valve body 26, 27 may be implemented by any measures, a tension spring being recommended in particular. To this extent, the preferred exemplary embodiment illustrated displays a double-sided action tension spring 34 which impinges both valve bodies 26, 27.

The preferred exemplary embodiment illustrated furthermore displays the valve bodies 26, 27 as valve balls. This corresponds to the prior art of DE 36 07 139 A1. Valve bodies of a different design, such as valve bodies which are rotation-symmetrical about one axis, are also employable.

The enlarged illustration in FIG. 4 now shows a peculiarity of the exhaust valve assembly 7' according to the invention, said peculiarity being that the safety valve seat 29 is integrally molded on the valve housing 22. This offers the advantages discussed in the general part of the description, since a further sealing point between the safety valve seat 29 and the valve housing 22 is systematically avoided.

At the opposite end which is assigned to the inlet 24, it is preferably provided here that the exhaust valve seat 28 is disposed on a valve bushing 35 which is inserted in a sealing manner at the inlet 24 of the valve housing 22. From this side, the valve housing 22 may be initially "fitted" with the two valve bodies 26, 27 and the tension spring 34. The valve housing 22 is then closed off using the valve bushing 35, and may be inserted into the valve receptacle 21 on the valve block 20.

FIG. 4 also indicates that, in the exemplary embodiment which is illustrated, and to this extent is preferable, the outlet 25 of the valve housing 22 is embodied as a rotation-symmetrical port, the safety valve seat 29 being located at the inner end thereof. This port is assigned a further function which will be discussed in more detail further below.

Both the valve block 20 as well as the valve housing 22 here are (largely) composed of plastics which are suitable for autoclaving (sterilizing at high temperatures in excess of 100° C., preferably in excess of 120° C.). As to details pertaining to various plastics and the abbreviations thereof, reference is made to the respective technical literature and to the general catalog of the applicant which has already been mentioned earlier.

The valve housing 22 has a stop portion 30, a fastening portion 31 which is distinct therefrom, and a sealing portion 32 which is distinct from both the former. The valve receptacle 21 has a matching stop portion 30, fastening portion 31, and sealing portion 32.

As can be seen from FIG. 4, the construction according to the invention is such that in the case of a valve housing 22 which has been installed in a functionally correct manner, the fastening portions 31 are in force-transmitting mutual engagement in such a manner that both the stop portions 30 as well as the sealing portions 32 bear on one another in a planar manner. On account thereof, a large sealing face, which is added to by the sealing face of stop portions 30 which bear on one another, results in the region of the sealing portions 32.

In the preferred exemplary embodiment illustrated, the valve housing 22 and the associated valve receptacle 21 define a longitudinal axis, and the stop portions 30 run perpendicularly to this longitudinal axis. In this way, the stop portions 30 have the optimal stopping effect and position the valve housing 22 in a dimensionally accurate manner in the valve block 20. An insertion movement of the valve housing 22 performed in the direction of the longitudinal axis is abruptly terminated when the stop portions 30 bear on one another.

It has already been pointed out in the general part of the description that the stop portions 30 may also be aligned so as to be slightly inclined in relation to the longitudinal axis, the maximum angle of inclination in relation to the perpendicular of the longitudinal axis to this extent being preferably 10°.

As opposed to the prior art, the sealing function of the valve housing 22 in the valve receptacle 21 has in any case been largely moved to the sealing portions 32. The sealing portions 32 in the case of a valve housing 22 which has been installed in a functionally correct manner should also bear on one another in a planar manner.

In principle the sealing portions 32 may be disposed on the external face of the valve housing 22 and on the internal face of the valve receptacle 21, respectively, so as to be parallel with the longitudinal axis. In this case, the precise manufacturing of the valve housing 22 has to be relied on in order for an adequate sealing effect to result here. Improved construction variants are discussed further below.

The preferred exemplary embodiment illustrated for the construction of the valve housing 22 shows that the stop portion 30 on the valve housing 22 is disposed on the front end of the valve housing 22 that is located in the valve receptacle 21, that the sealing portion 32 is disposed in the direction of the opposite, rear end of the valve housing 22, so as to adjoin the stop portion 30, and that the fastening portion 31 is disposed in the direction of the rear end of the valve housing 22, so as to adjoin the sealing portion 32.

It has already been pointed out in the general part of the description that in principle a variant in which the stop portions 30 may be disposed between the fastening portions 31 and the sealing portions 32, or may even be entirely disposed at the front end, even ahead of the fastening portions 31, may be chosen. However, in the construction which is illustrated in FIG. 4, the sealing effect of the stop portions 30, which is already present in the prior art, results, on account of which the sealing effect of the sealing portions 32 which are primarily responsible for sealing is supported.

The preferred exemplary embodiment illustrated furthermore displays a particularly expedient construction in the form of the alignment of the sealing portions 32. The sealing effect is optimized in that the sealing portions 32 are aligned at an acute angle in relation to the longitudinal axis, preferably at an angle between 1° and 20°, particularly preferably at an angle between 2° and 10°, and in the embodiment shown at an angle of 2.5° in relation to the longitudinal axis. While the stop portions 30 in the preferred exemplary embodiment illustrated are aligned so as to be exactly perpendicular to the longitudinal axis of the valve housing 22, the sealing portions 32 are not aligned so as to be exactly parallel with the longitudinal axis, but are at an acute angle thereto.

Assuming a rotation-symmetrical embodiment of the valve housing 22 and of the valve receptacle 21, this corresponding to a preferred construction, this means that the sealing portions 32 are configured in a truncated-cone shape.

The components which bear on one another during autoclaving are elastically and plastically deformed on the sealing portions 32 (typically by less than 1 mm, for example by about 0.4 mm). Static redundant dimensioning results, which according to the invention is utilized in a targeted manner for guaranteeing optimal sealing of the valve housing 22 in the valve receptacle 22, even following a plurality of passes during autoclaving.

The preferred exemplary embodiment illustrated in FIG. 4 on account of the scale does not let it be seen that according to a preferred teaching of the invention, the angle of the sealing portion 32 on the valve receptacle 21 in relation to the longitudinal axis may be up to 2.5° larger than the angle of the sealing portion 32 on the valve housing 22. In this way, the sealing portion 32 on the valve housing 22 initially touches the sealing portion 32 on the valve receptacle 21 only by way of linear contact. If force is exerted by the fastening portions 31 in the direction of the longitudinal axis, the linear contact by way of deformation of the sealing portions 32 is transformed into a planar contact. Over time, accelerated in particular by high temperatures as in autoclaving, successive completion of the planar contact and thus reliable sealing across the sealing portions 32 is performed.

Where the sealing portions 32 are aligned at an acute angle in relation to the longitudinal axis, the stop portions 30 may also be dispensed with, which however is not illustrated here. Said stop portions 30 may either be mutually spaced apart or be entirely deleted. On account of the truncated-cone shaped design of the sealing portions 32, the effect of a stop is likewise implemented.

FIG. 4 shows a further construction peculiarity of the preferred exemplary embodiment illustrated of a valve block assembly 4. It is specifically provided here that the sealing portion 32 on the valve receptacle 21 of the exhaust valve assembly 7' is configured on a wall on the valve block 20, said wall here being preferably free-standing. In the preferred exemplary embodiment illustrated, the wall has a uniform wall thickness, the latter preferably being 1 mm to 4 mm, in particular 2 mm, as is illustrated. This results in optimum flexibility in order for adapted deformation of the wall and thus of the sealing portion 32 on the wall to be achieved.

A targeted design embodiment as on the valve block 20 is also provided according to a preferred teaching in a corresponding manner on the valve housing 22. To this end, it is provided according to a preferred teaching that the sealing portion 32 on the valve housing 22 is configured on a wall of the valve housing 22, said wall here being preferably free-standing. The preferred exemplary embodiment illustrated shows the wall of the valve housing 22 close to the stop portion 30 being somewhat thinner than close to the fastening portion 31. However, overall attention has been paid to the thickness of the wall of the valve housing 22 not being greater than the thickness of the wall of the valve block 20 in the region of the sealing portions 32.

As is already practiced in the prior art, it is particularly preferably provided according to the invention that here in any case components which are manufactured in the plastics injection-molding method are largely employed. Fluoropolymers are typical examples of plastics which may be used here.

As has already been repeatedly illustrated here, the focus is on a targeted deformation, which is as minimal as possible, of the components on the sealing portions 32, while having a corresponding planar bearing on the stop portions 30. This still is to be so effective after autoclaving or repeated autoclaving that sealing of the valve housing 22 in the valve receptacle 21 is not compromised.

In order for the desired result to be optimized, a further preferred design embodiment which is wherein both the plastics of the valve block 20 as well as the plastics of the valve housing 22 have a tensile strength of in excess of 12 MPa at 120° C. (EN ISO 12086) is recommended. The limit of the tensile strength at 120° C. is intended to guarantee that adequate residual elasticity is retained even after repeated autoclaving. In conjunction with the smart arrangement of the sealing portions 32, the result according to the invention is achieved in a particularly expedient manner.

Furthermore, an adapted pairing of materials for the plastics of the components bearing on one another may be implemented. To this end, it is recommended that the plastics of the valve block 20 have a tensile strength (measured at 23° C.) which is higher by 40% to 100% than the plastics of the valve housing 22. In one preferred exemplary embodiment which fulfills this construction requirement, the valve block 20 is composed of fluoropolymer (min. temperature: 150° C., elasticity modulus at 23° C.: 500-1100 MPa). In this case, an adequate fluoropolymer for the valve housing 22 is for example (max. temperature: 250° C., elasticity modulus at 23° C.: 400-700 MPa).

It is achieved according to the invention that the valve block assembly 4 does not need to be disassembled for autoclaving.

The preferred exemplary embodiment illustrated in FIG. 4 shows that the fastening portions 31 are embodied as mutually engaging screw thread portions. This is the preferred design embodiment which enables particularly sensitive insertion of the valve housing 22 into the valve receptacle 21. Alternatives include, for example, a bayonet connection or a short-stroke collet. However, in terms of impinging the sealing portions 32 with force, these two alternatives are not as precise as a thread connection.

To this end, a particularly preferred design embodiment is recommended in such a manner that an actuation portion having force-engaging elements for actuating the fastening portion is disposed on the valve housing, so as to adjoin the fastening portion. Moreover, the valve housing 22 here on the outlet 25, which has been extended in a port-like manner, may also be provided with a stop 40 which interacts with a longitudinal stop 38 on the connector end 33.

A further construction peculiarity which is of independent innovative relevance results from FIG. 4 in such a manner that the connector end 33 is provided with a support collar 36 which surrounds this connector end 33 in a concentric manner. In the assembled state as shown here, the rotation-symmetrical port, which is formed by the outlet 25 of the valve housing 22 and on the inner end of which the safety valve seat 29 is located, is between the connector end 33 and the support collar 36. Joining the connector end 33 into the outlet 25 is more reliable on account of the support collar 36 which is likewise push-fitted onto the rotation-symmetrical port which is formed by the connector end 33. Moreover, the external contour of the connector end 33, which is provided as a sealing face, is protected against damage by the surrounding support collar 36. This is particularly advantageous, since the end-side openings on the connector end 33, which have been described above, cause the end of the connector end 33 to become relatively unstable. Without protection by the support collar 36, the correspondingly delicate connector end 33 could be easily deformed, compromising the function thereof.

Sealing of the connector end 33 in the outlet 25 according to the invention is further improved in the exemplary embodiment in that radially encircling sealing beads 37 are molded externally on the connector end 33. Each sealing bead 37 constitutes a discrete seal. On account of the plurality of sealing beads 37, the overall sealing effect is optimized. Excellent sealing is maintained even when considering repeated disassembling and assembling of the exhaust valve assembly 7' by an operator.

The design embodiment having the support collar 36 furthermore makes it possible that the support collar 36, as has also been illustrated here, has a longitudinal stop 38 for the connector end 33. The insertion length of the connector end 33 in the outlet 25 is delimited by way of this longitudinal stop 38, which is configured here and preferably on a grading of the support collar 36, in conjunction with the stop 40. The connector end 33 then only projects into the safety valve seat 29 so far as is required for the liquid to flow around the end-side openings. For example, an undercut at this point, which is difficult to ventilate, may be avoided on account thereof. Overall handling is very user friendly and functionally reliable. Moreover, a high level of tightness results.

Guiding and protection are particularly resistant to bending loads when the support collar 36 at the end side protrudes in an upstream direction beyond the connector end 33.

Figure 5:
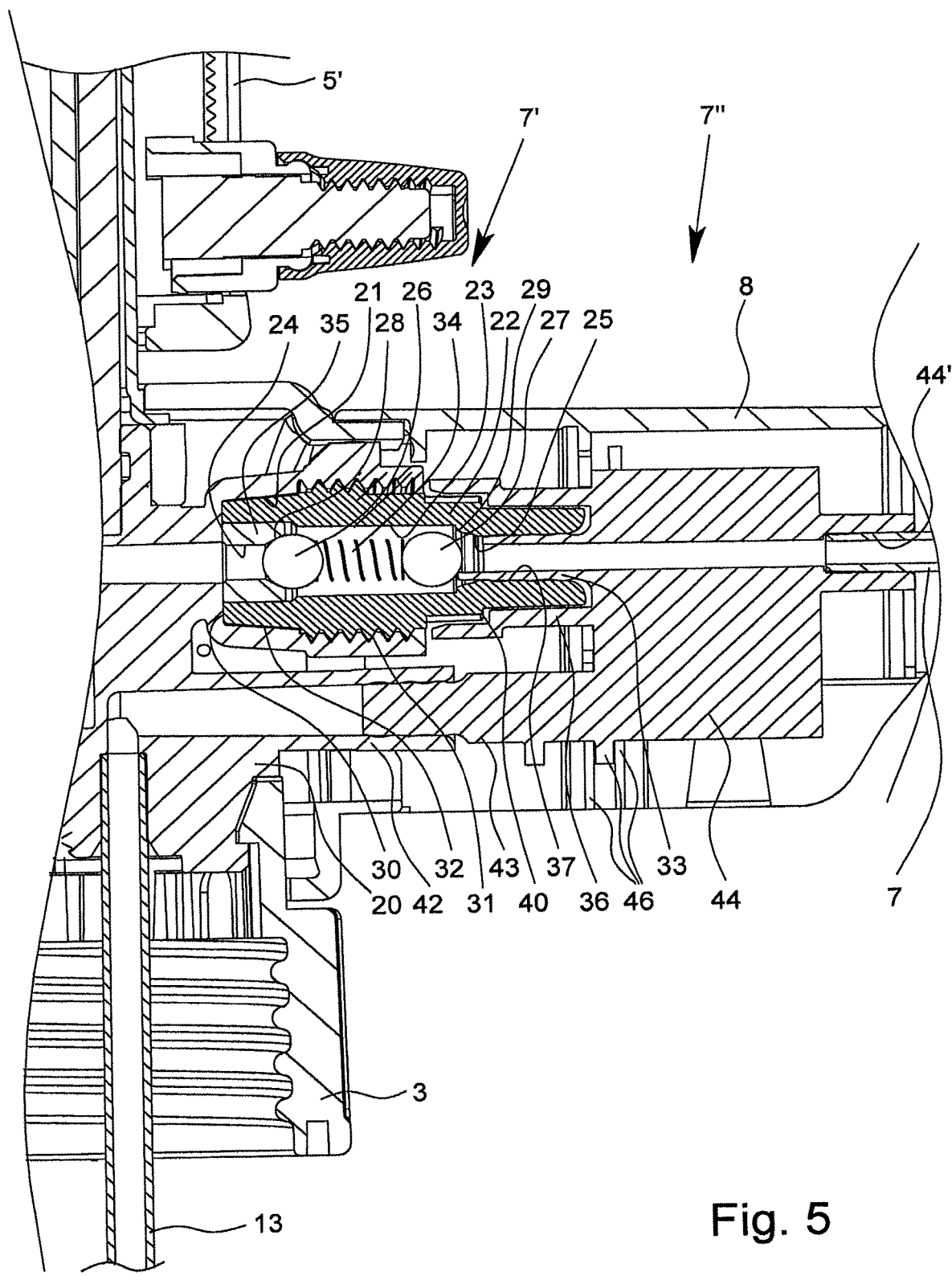
FIG. 5 shows an assembly without a switching valve, but having a line adaptor, in a partial illustration corresponding to FIG. 4.

A construction in which no switching valve 14 is provided may be seen in FIG. 5. A further particular teaching of the invention may be derived from a comparison of FIGS. 4 and 5, said teaching relating to an exhaust line assembly 7". The position of the exhaust line assembly 7" in FIG. 3 has been marked. The position of the exhaust valve assembly 7' and the position of the exhaust line assembly 7" are also indicated in FIGS. 4 and 5.

It initially applies in equal measures to FIGS. 4 and 5 that the valve block 20 of the valve block assembly 4 is prepared for return dosing. To this end, a return flow duct 41 which terminates in a return flow inlet 42 is provided in the valve block 20. In both cases, the return flow line 13 also protrudes downward from the valve block 20 in FIGS. 4 and 5, despite not being required in the exemplary embodiment of FIG. 5.

In the exemplary embodiment of FIG. 4, having the switching valve 14, the connector end 33 which is plug-fitted in the outlet 25 of the valve housing 22 is disposed upstream on the switching valve 14. An alternative would be constituted by a kinematically reversed construction, having a connector end which is push-fitted onto an outlet of the valve housing.

Additionally, a return flow connector 43 which is plug-fittable into a return flow inlet 42 of the valve block 20 (or is push-fittable thereon in the alternative) is located upstream on the switching valve 14. This construction corresponds to the switching valve 14 in an exhaust line assembly 7" of the prior art.

The peculiarity of the construction according to the invention now lies in that a similar line assembly is nevertheless provided in the interior of the exhaust line assembly 7", even when no switching valve 14 is provided. To this end, FIG. 5 shows that, in this case, the exhaust line assembly 7" has a line adaptor 44 which is disposed ahead of the exhaust line 7 in the flow direction of the liquid. The exhaust line 7 is connected to said line adaptor 44 so as to be downstream, while the connector end 33 which is plug-fitted into the outlet 25 of the valve housing 22 (or is push-fitted thereon), and the return flow connector 43 which is plug-fitted into the return flow inlet 42 of the valve block 20 (or is push-fitted thereon) are disposed upstream. The peculiarity in this case lies in that the connector end 33 in the line adaptor 44 is permanently connected to the exhaust line 7 which is connected downstream, and in that the return flow connector 43 is closed. The latter is embodied as a blind connector, such that the return flow inlet 42 of the valve block 20 is closed off therewith.

As is mentioned above, the subject matter of the invention is also a complete valve block assembly 4, an exhaust valve assembly 7' according to the invention being then assigned thereto. To this extent, the design of the stop portions 30, fastening portions 31, and sealing portions 32 is of particular interest. This assembly has been described in detail further above, and reference may be made thereto.

It can be derived from the illustration in the preceding narrative that the teaching of the invention is not only relevant to the functional group of an exhaust valve assembly 7', but may also be implementable in a valve block assembly 4 which comprises an exhaust valve assembly 7'.

Furthermore, the teaching of the invention is also relevant to a corresponding exhaust line assembly 7", as has been explained above in detail.

Finally, the teaching of the invention is also relevant to an overall bottle attachment apparatus 1 for handling liquids, in which an exhaust valve assembly 7' according to the invention and/or an exhaust line assembly 7" according to the invention and/or a valve block assembly 4 according to the invention are provided.

Furthermore, a peculiarity which further contributes toward user friendliness and simple handling for the complete bottle attachment apparatus 1, which here is illustrated in the assembled state, can further be seen in FIGS. 3 and 4. The focus is on the fact that the exhaust line assembly 7" is attached to the valve block assembly 4 and/or to the external housing 6 in a replaceable manner and forwardly protrudes from the valve block assembly 4 and/or from the external housing 6, that the exhaust line assembly 7" has a cantilever-type mount 8 and an exhaust line 7 which is disposed and guided in the mount 8, and that the mount 8 is releasably attached, preferably by means of a form-fitting connection, to the valve block assembly 4 and/or to the external housing 6.

Figure 6:
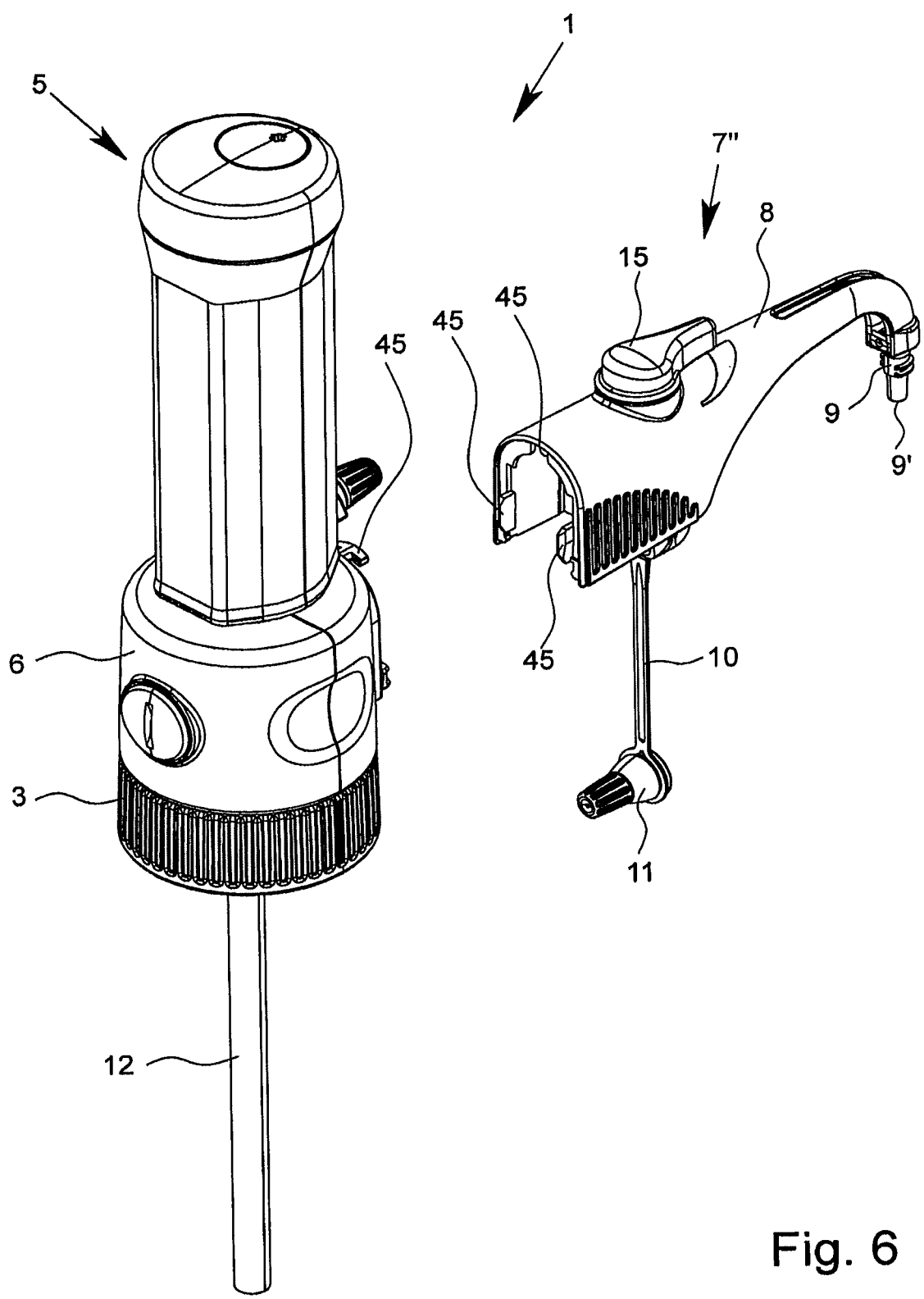
FIG. 6 shows the bottle attachment apparatus of FIG. 1, with the mount removed, in a perspective view from the rear.
Figure 7:
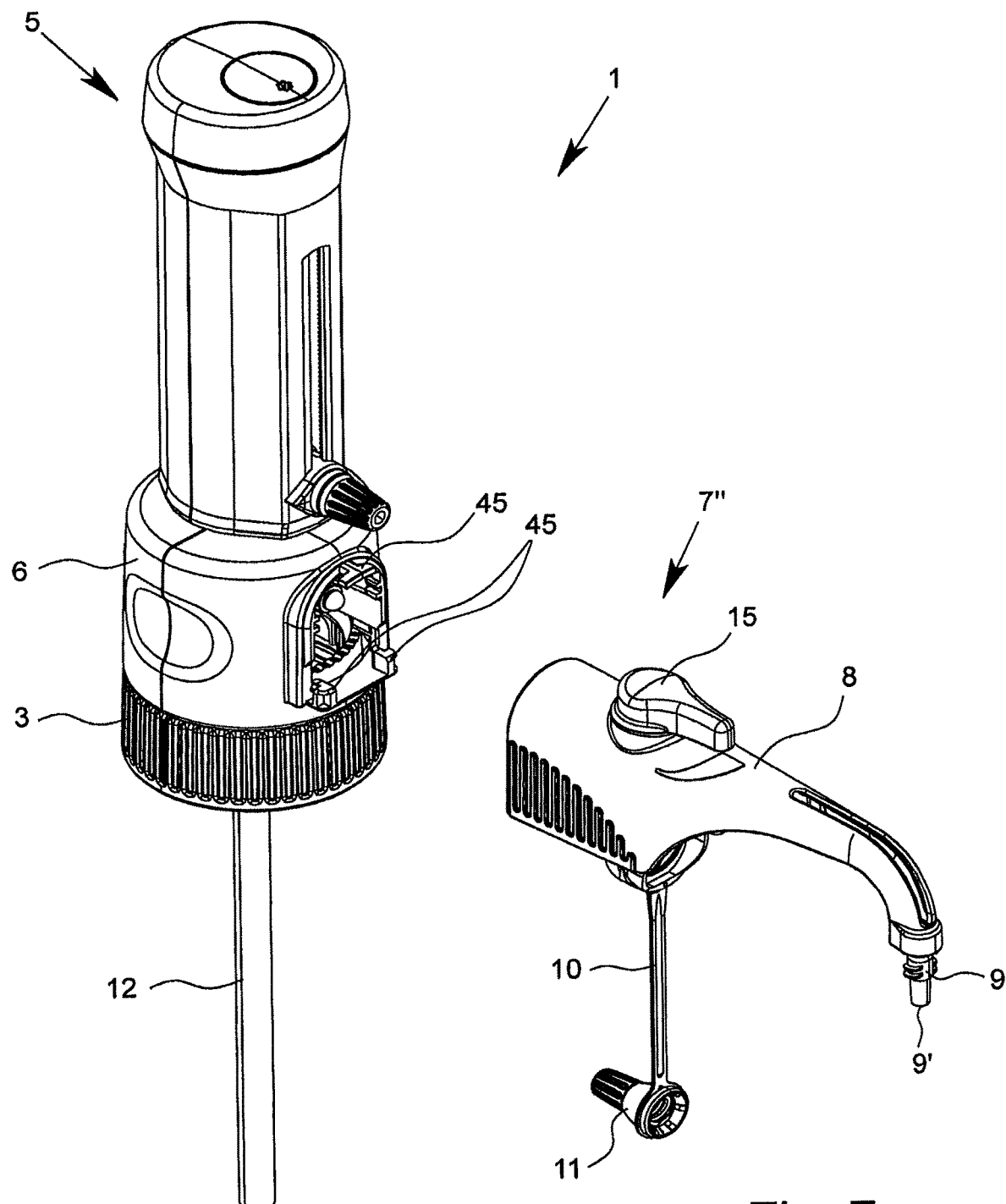
FIG. 7 shows the bottle attachment apparatus of FIG. 6, in a perspective view from the front.

FIGS. 6 and 7 show the bottle attachment apparatus 1 with the mount 8 removed. Also illustrated are connection elements 45 which are in each case positioned in a matching manner. The latter are embodied as form-fitting elements. The construction according to the invention in FIGS. 6 and 7 displays the connection elements 45 as hooks and matching clearances which mutually engage in a vertical manner.

The preferred exemplary embodiment illustrated by means of FIG. 5 further shows that the mount 8 is connected to the switching valve 14 or to the line adaptor 44, respectively, in a form-fitting but movable (and preferably also releasable) manner. The line adaptor 44 here, on the external side thereof, has guide elements 46 in the form of vertically aligned ribs which are vertically bordered by guide webs in the mount 8, as is illustrated in FIG. 5. This may be similarly implemented on the switching valve 14 (FIG. 4).

In particular, it may be provided in the construction of the exhaust line assembly 7" according to the invention that the mount 8 in relation to the switching valve 14 or to the line adaptor 44 is attachable in two vertically dissimilar positions, namely in an upper position in which the mount 8 is displaceable up to the external housing 6, and a lower position in which the mount 8 is connected to the external housing 6 so as to be form-fitting in the horizontal direction.

Finally, a few construction peculiarities of the exemplary embodiment illustrated are to be noted by means of the drawing, i.e., FIGS. 4 and 5.

The switching valve 14 or the line adaptor 44 has a receptacle 44' for the exhaust line 7 which is to be connected downstream, said receptacle 44' preferably being embodied as an inner taper.

The mount 8 in relation to the switching valve 14 or the line adaptor 44, once attached thereto, is displaceable only in the vertical direction between the two positions thereof. According to one preferred design embodiment, the mount 8 is latchable in both vertical positions on the switching valve 14 or on the line adaptor 44, respectively. The latching positions preferably assist an assembly procedure of the exhaust line assembly 7" on the valve block assembly 4 in such a manner that the mount 8 is located in a defined position in relation to the external housing 6 when the switching valve 14 or the line adaptor 44, respectively, is plugged onto the valve block 20 having the outlet 25 and the return flow valve 42.

The return flow inlet 42 on the valve block 20 in FIGS. 4 and 5 is embodied so as to laterally protrude extensively. On account thereof, the return flow inlet 42 which is likewise composed of plastics, has a certain flexibility such that the return flow connector 43 may be readily plug-fitted or push-fitted.

For an embodiment of the exhaust line assembly 7" having a switching valve 14 and a toggle 15, in place of the toggle 15, the mount 8 may be of a different design embodiment than in the embodiment of the exhaust line assembly 7" having a line adaptor 44. However, it may also be provided that the mount 8 has the same design embodiment, but at the opening for the toggle 15, which is provided in the embodiment having a switching valve 14, is closed off by a cover.

The mount 8 in relation to the switching valve 14 or the line adaptor 44, respectively, in the lower position which is the operating position may be latched to the external housing 6 and/or to the valve block assembly 4. A connection to the external housing 6 in the case of the mount 8 is recommended such that the walls of the latter are externally guided by the external housing 6.

As has already been discussed in the general part of the description, the mount 8 as a structural component offers further improvement of operability. The liquid-conducting connections may be largely kept free from bending momentums in the case of this construction.

This description uses examples to disclose the invention including the best mode enabling any person skilled in the art to make and use the invention. The patentable scope of the invention, however, is defined by the claims, and may include other examples that occur to those skilled in the art. Such other examples are intended to be within the scope of the claims if they have structural elements that do not differ from the literal language of the claims, or if they include structural elements equivalent to the structural elements covered by the literal language of the claims.

What is claimed is:

1. A bottle attachment apparatus for handling liquids, comprising:
   a cylinder-and-piston assembly for suctioning and exhausting liquid,
   a valve block assembly, and
   a fastening assembly for fastening the valve block assembly on a storage bottle,
   wherein the valve block assembly has a valve block, an exhaust valve assembly, and a valve receptacle assigned to the exhaust valve assembly,
   wherein the valve block comprises an intake valve separated from the exhaust valve assembly,
   wherein the exhaust valve assembly extends away from the valve block in an approximately horizontal manner and has a valve housing which forms a valve chamber having an inlet and an outlet, and which is insertable into the valve receptacle of the valve block in a replaceable and sealing manner, and
   wherein the exhaust valve assembly comprises at least one of:
   a) an exhaust line assembly comprising:
   an exhaust line,
   a switching valve disposed upstream of the exhaust line in a liquid flow direction,
   wherein the exhaust line is connected to the switching valve downstream thereof in a liquid flow direction,
   wherein a connector end is disposed on the switching; valve so as to be upstream thereof in a liquid flow direction, wherein the connector end is plug- or push-fittable into or onto the outlet of the valve housing, and
a return flow connector which is plug- or push-fittable into or onto the return flow inlet of the valve block, or
b) an exhaust line assembly comprising:
an exhaust line,
a line adaptor being disposed upstream of the exhaust line in a liquid flow direction,
wherein the exhaust line is connected to the line adaptor downstream thereof in a liquid flow direction,
wherein a connector end is disposed on the line adapter so as to be upstream thereof in a liquid flow direction,
wherein the connector end is plug- or push-fittable into or onto the outlet of the valve housing,
wherein the connector end in the line adaptor is connected to the exhaust line which is connected downstream thereof in a liquid flow direction, and a return flow connector is plug- or push-fittable into or onto the return flow inlet of the valve block, and
wherein the return flow connector is a closed blind connector by way of which the return flow inlet of the valve block is closable.

2. The bottle attachment apparatus as claimed in claim 1, wherein the exhaust line assembly is attached to the valve block assembly in a replaceable manner and forwardly protrudes from the valve block assembly, wherein the exhaust line assembly has a cantilever mount, wherein the exhaust line is disposed and guided in the mount, and wherein the mount is releasably attached to the valve block assembly.

3. The bottle attachment apparatus as claimed in claim 2, wherein the mount of the exhaust line assembly is connected to one of the switching valve and the line adaptor in a form-fitting but movable manner.

4. The bottle attachment apparatus as claimed in claim 3, wherein the mount is attachable to the external housing, and has a lower position in which the mount is connected to the external housing so as to be form-fitting in a horizontal direction.

5. The bottle attachment apparatus as claimed in claim 1, wherein a port is formed by the outlet of the valve housing, wherein the connector end is provided with a support collar which surrounds the connector end in a concentric manner, and wherein the port is located between the connector end and said support collar surrounding the connector end.

* * * * *